(12) United States Patent
Klein

(10) Patent No.: US 10,440,033 B2
(45) Date of Patent: Oct. 8, 2019

(54) DATA STORAGE SYSTEM FILE INTEGRITY CHECK

(71) Applicant: SAP SE, Walldorf (DE)

(72) Inventor: Udo Klein, Nussloch (DE)

(73) Assignee: SAP SE, Walldorf (DE)

( * ) Notice: Subject to any disclaimer, the term of this patent is extended or adjusted under 35 U.S.C. 154(b) by 224 days.

(21) Appl. No.: 15/460,691

(22) Filed: Mar. 16, 2017

(65) Prior Publication Data

US 2018/0270252 A1    Sep. 20, 2018

(51) Int. Cl.

| | |
|---|---|
| *G06F 21/00* | (2013.01) |
| *H04L 29/06* | (2006.01) |
| *G06F 21/64* | (2013.01) |
| *G06F 16/16* | (2019.01) |
| *G06F 16/14* | (2019.01) |
| *G06F 16/23* | (2019.01) |
| *G06F 21/78* | (2013.01) |

(52) U.S. Cl.
CPC .......... *H04L 63/123* (2013.01); *G06F 16/152* (2019.01); *G06F 16/16* (2019.01); *G06F 16/2365* (2019.01); *G06F 21/64* (2013.01); *H04L 63/10* (2013.01)

(58) Field of Classification Search
CPC .. H04L 63/123; H04L 63/10; G06F 17/30115; G06F 17/30109; G06F 17/30371
See application file for complete search history.

(56) References Cited

U.S. PATENT DOCUMENTS

| | | |
|---|---|---|
| 8,978,155 B2 | 3/2015 | Erway et al. |
| 8,984,363 B1 * | 3/2015 | Juels ................ H04L 9/3221 714/752 |
| 2009/0150168 A1 | 6/2009 | Schmidt |
| 2009/0287931 A1 | 11/2009 | Kinsella |

(Continued)

FOREIGN PATENT DOCUMENTS

| | | |
|---|---|---|
| WO | 2006/126006 A1 | 11/2006 |
| WO | WO-2016160532 A1 * | 10/2016 ........... H04L 9/0643 |

OTHER PUBLICATIONS

Bruce Schneier, John Kelsey; "Secure audit logs to support computer forensics"; ACM Transactions on Information and System Security (TISSEC): vol. 2 Issue 2, May 1999; Publisher: ACM; pp. 159-176 (Year: 1999).*

(Continued)

*Primary Examiner* — Kendall Dolly
*Assistant Examiner* — Courtney D Fields
(74) *Attorney, Agent, or Firm* — Jones Day

(57) ABSTRACT

An integrity check for a first file is initiated. In response, a first key corresponding to the first file is obtained. The first file is hashed to determine that the first key is not equivalent to the hashed first file. A second key is then obtained that corresponds to the hashed first file. A second file is then obtained using the second key. This second file is hashed to determine whether the second key is equivalent to the hashed second file. Integrity of the first file is confirmed if the second key is equivalent to the hashed second file or integrity of the first file is rejected if the second key is not equivalent to the hashed second file. Related apparatus, systems, techniques and articles are also described.

19 Claims, 5 Drawing Sheets

(56) References Cited

U.S. PATENT DOCUMENTS

2016/0021044 A1 1/2016 Hermitage
2017/0075938 A1* 3/2017 Black .................... G06F 21/602

OTHER PUBLICATIONS

Schneier, Kelsey Secure Audit Logs to Support Computer Forensics, 1999. URL: https://www.schneier.com/academic/paperfiles/paper-auditlogs.pdf Obtained from the Internet on Mar. 16, 2017 (12 pages).
Yavuz, Ning, Reiter—Efficient, Compromise Resilient and Append-only Cryptographic Schemes for Secure Audit Logging, 2011. URL:http://www4.ncsu.edu/~aayavuz/YavuzNingReiterLogFAS11.pdf Obtained from the Internet on Mar. 16, 2017 (16 pages).

* cited by examiner

DATA STORAGE SYSTEM FILE INTEGRITY CHECK

TECHNICAL FIELD

The subject matter described herein relates to the storage of data in a manner that is both auditable and which protects such data from unauthorized access.

BACKGROUND

Computer-based forensics presents many difficulties including the ability to reliably provide an uninterrupted chain of evidence. Such a chain of evidence ideally maintains the integrity of data by making it impossible to fabricate or destroy evidence at will. However, there is a rising need to erase collected data. Due to privacy concerns, and other legal reasons, it may be required (e.g. by court order) to erase data in a provable manner. Such a requirement can often conflict with the requirement for an uninterrupted chain of evidence.

SUMMARY

In a first aspect, an integrity check for a first file is initiated. In response, a first key corresponding to the first file is obtained. The first file is hashed to determine that the first key is not equivalent to the hashed first file. A second key is then obtained that corresponds to the hashed first file. A second file is then obtained using the second key. This second file is hashed to determine whether the second key is equivalent to the hashed second file. Integrity of the first file is confirmed if the second key is equivalent to the hashed second file or integrity of the first file is rejected if the second key is not equivalent to the hashed second file.

It can also be determined whether metadata associated with the second file comprises a reference to the first key. In such cases, integrity of the first file can be confirmed if the metadata associated with the second file comprises a reference to the first key and integrity of the first file is rejected if the metadata associated with the second file does not comprise a reference to the first key. The metadata can indicate that at least a portion of the first file has been deleted.

The first and second files can be stored in a data storage system having an audit log in which all changes to the first and second files are logged. In addition, all accesses to the first and second files can be logged in the audit log.

At least one of the first file and the second file can have a structure that can be represented as a hierarchy of nodes including a root node. In such cases, the hashing can only hash the root node of the corresponding first file or second file. Such a structure can be, for example, a Merkle tree.

Alternatively, the first file can be hashed to determine that the first key is equivalent to the hashed first file.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter advantageously allows for the removal of data without breaking a chain of evidence. In addition, the current subject matter allows for the verification that a particular piece of data was actually deleted by two different and independent means (i) the audit trail will document that the data was erased; and (ii) the storage has an in place instead of the former document. In particular, the current subject matter can be used by the owner of the original document to compute a hash of a particular document and have it verified that the storage address for this key does not contain the original data anymore.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to systems, methods, and articles for protecting data while, at the same time, enhancing the ability to audit the disposition of such data for various purposes including forensics. The current subject matter is flexible in nature and can adapt as mass data storage expands and different storage techniques are adopted. Further, the current subject matter is applicable to distributed data systems/services including cloud-based storage as well as distributed database systems.

Figure 1:
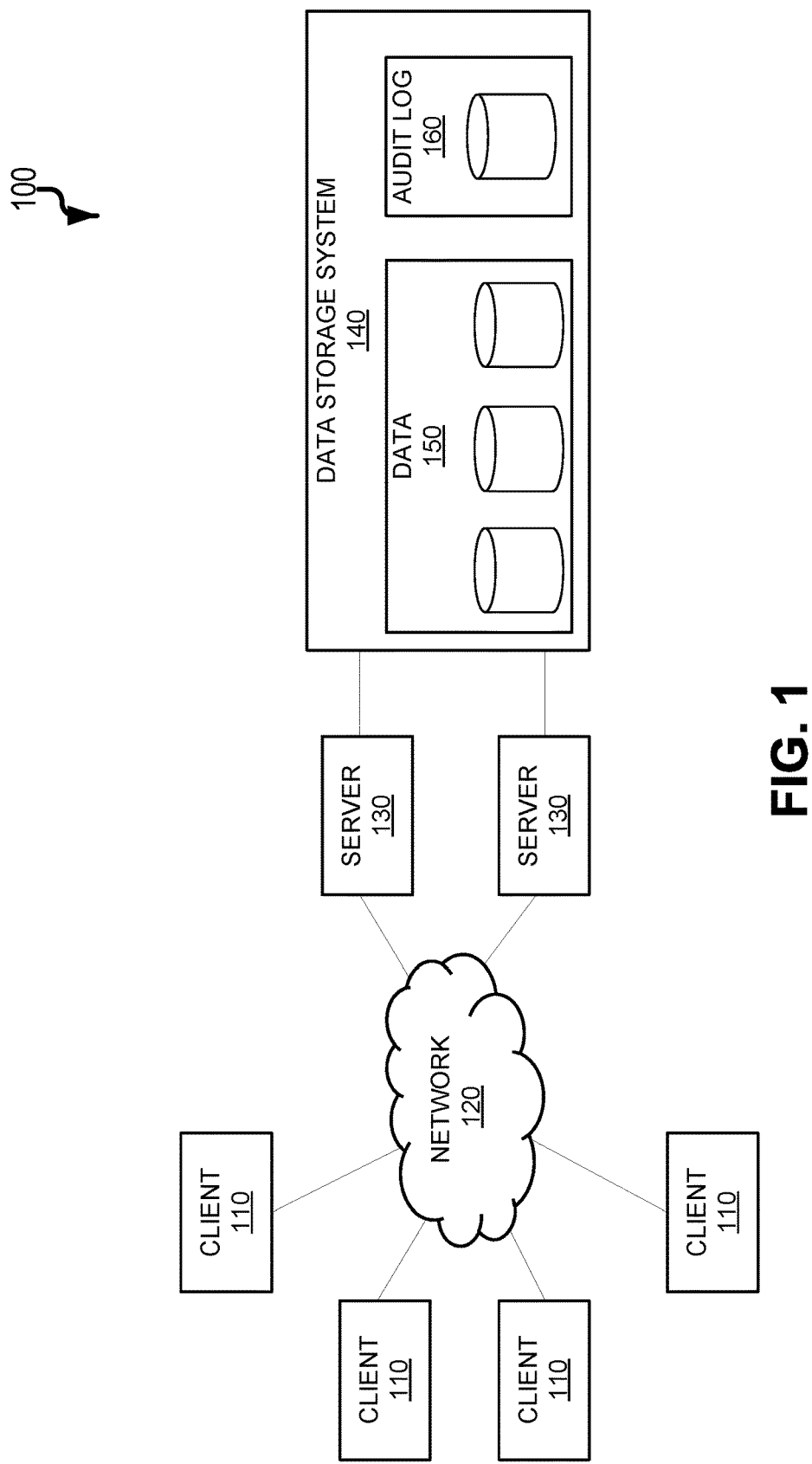
FIG. 1 is a system diagram illustrating a data storage system.

FIG. 1 is a system diagram 100 illustrating an arrangement in which a plurality of computer clients 110 (e.g. servers, personal computers, mobile phones, tablet computers, etc.) access a data storage system 140 that stores data 150. The data storage system 140 can be an object storage, a file system and/or a database. The clients 110 can access the data 150 by way of one or more services (or direct connections for non web-based architectures) that provide access to the data storage system 140 by way of a computer network 120 (which may allow wired and/or wireless communications) and one or more intervening web servers 130. Such services allow the clients 110 to request data forming part of the data 150. It will be appreciated that each client 110, web server 130, and the data storage system 140 may each comprise memory and one or more programmable processors which can be distributed across one or more computing devices. For example, the data storage system 140 can comprise a data center or data centers storing the data 150 across hundreds or thousands of databases (which may or not be at a same physical site).

With the current subject matter, the data storage system 140 can provide for auditability (i.e., the ability to audit) of the data 150 using forward secure cryptographic mechanisms. In particular, the data storage system 140 can implement an append only audit log 160 that is forward secure (i.e., old entries in the audit log 160 cannot be altered or deleted, etc.).

The data storage system 140 can store the data 150 (in the form of files) using a layer of data structures. The lowest layer can comprise evidence files imported from forensic tools such as X-Ways, Encase, FTK, Nuix, XRY, UFED and the like. The files can be stored in the data storage system 140 as part of the data 150 and can include, for example, the original names and path or directory names for the files, filesystem permissions, and other metadata.

The data storage system 140 can provide a key for each file forming part of the data 150. The key for each file can be a secure hash of the file contents. That is key(file):=secure_hash(content(file)). Stated differently, the keys for the files can be secure hash pointers. As a consequence the integrity of each file can be verified by (re)computing the hash of its contents. The hashes can also be used by the data storage system 140 to detect duplicate files forming part of the data 150.

The metadata of the files can be stored in the data storage system 140 in a similar manner as that of the files forming part of the data 150. The metadata can comprise forensic metadata as well, in particular the provenience of the file(s). That is key(metadata):=secure_hash(metadata). Deletion of content and/or metadata can be achieved by replacing the content stored under the hash key by special erased marker content. The erased marker can be stored several times and it can be a document that specifies the reason (e.g. a court order, etc.) for the file deletion and metadata characterizing the specific erase action (e.g. who, why and/or when, etc.). The erased marker can be stored like a regular document in the document storage system 140. The data storage system 140 can overwrite the objects stored under the access keys causing them to be erased.

Figure 2:
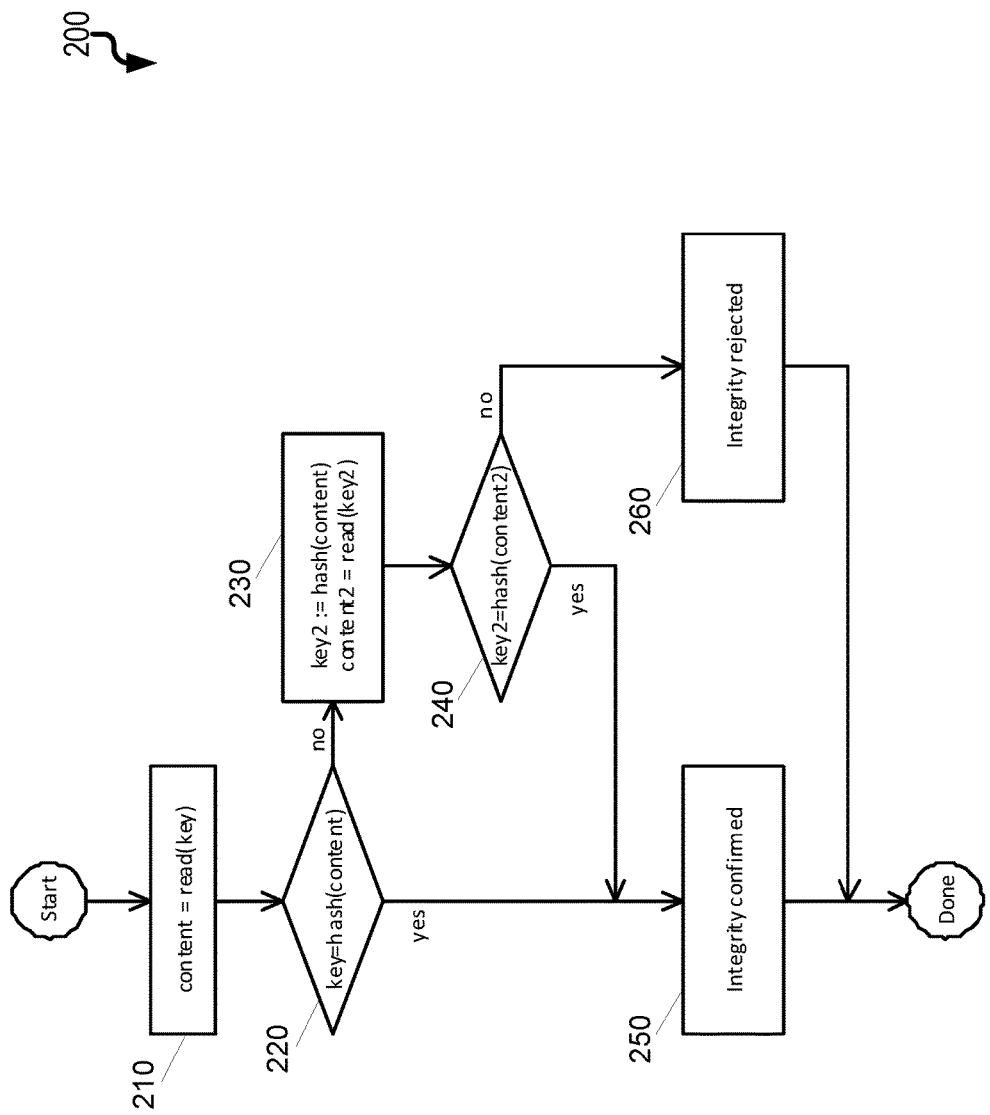
FIG. 2 is a first process flow diagram illustrating an integrity check of a document.

The integrity check on the file level in the data storage system 140 can be as illustrated in process flow diagram 200 of FIG. 2. Initially, at 210, a first key is accessed to identify first content (i.e., a file, etc.) in the data storage system 140. Thereafter, at 220, the first content is hashed to determine whether the hashed first content is equivalent to the accessed key. If the hashed first content is equivalent to the accessed first key, then, at 250, the integrity of the file is confirmed. If not, then, at 230, the hashed content is used as a second key and second content (i.e. a file) is accessed using such second key. Subsequently, at 240, the second content is hashed to determine whether it is equivalent to the second key. If the hashed second content matches the second key, then, at 250, the integrity of the content is confirmed. Otherwise, at 260, the integrity of the file is rejected.

The erase document will have a hash pointer (the key) to the erased document. In addition, with the audit log 160, all actions relating to the data 150 is auditable because there is a forward secure audit trail. However, issues can arise if only partial contents of a container file need to be erased. For example, a file can comprise a mail archive and due to a court order all privileged client attorney communication from within this container shall be erased or redacted.

The naïve idea is to replace the container with a new container which does not contain the erased data. However, this arrangement will lead to a different hash for the container given the differences in content. In particular the new container will either fail the integrity check or it will have a different key. This situation, in turn, will require all references to the file to be updated which in turn would have a similar effect on their references.

Figure 3:
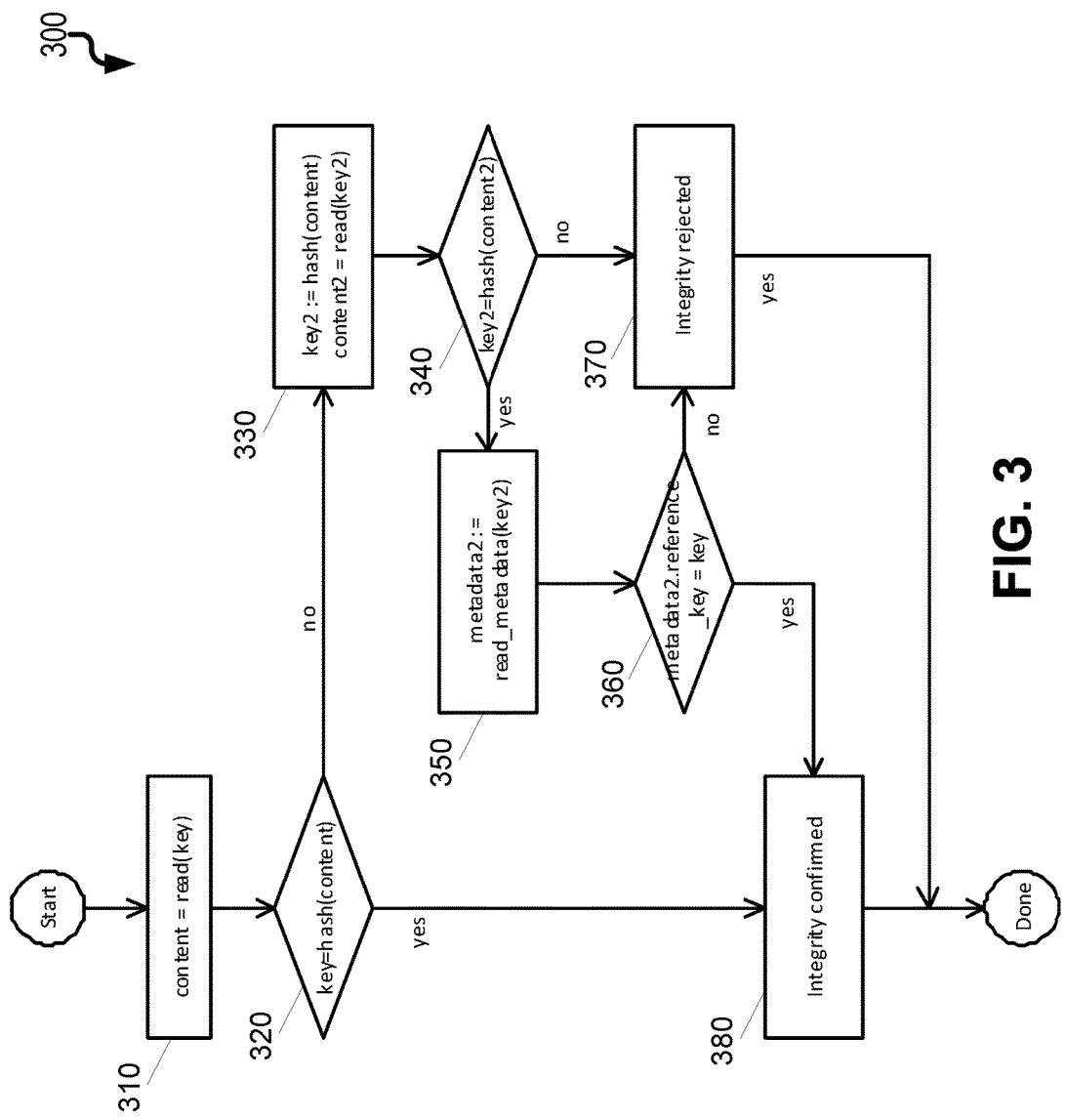
FIG. 3 is a second process flow diagram illustrating an integrity check of a document.

Diagram 300 of FIG. 3 illustrates a variation of an integrity check on the file level in the data storage system 140. Initially, at 310, a first key is accessed to identify first content (i.e., a file, etc.) in the data storage system 140. Thereafter, at 320, the first content is hashed to determine whether the hashed first content is equivalent to the accessed key. If the hashed first content is equivalent to the accessed first key, then, at 380, the integrity of the file is confirmed. If not, then, at 330, the hashed content is used as a second key and second content (i.e. a file) is accessed using such second key. Subsequently, at 340, the second content is hashed to determine whether it is equivalent to the second key. If the hashed second content matches the second key, then, at 350, a metadata associated with the second key is read and, at 370, it is determined whether the metadata references the first key. If the metadata references the first key, then, at 380, the integrity of the file is confirmed. Otherwise, at 370, the integrity of the file is rejected.

The approach of FIG. 3 will not affect read accesses for the data storage system 140. If a document is replaced or erased, there will always be a new document which will be found under the old key. This document will contain either the cleaned content and/or there will be information (as part of the metadata) why, when and by whom the substitution or erasure has taken place.

Various types of hash functions can be utilized including, for example, sha256 or sha512. Further, the data storage system 140 can optionally store hashes of different secure hash functions. For large size files, their internal graph structure can be exploited especially if such containers are structured in a tree style manner. Thus, the whole document need not be hashed. Rather, a representation such as a Merkle tree of the document can be stored and a hash of the root node of such tree can be used as the hash of the document. This approach allows for parts of documents to be erased without reparsing/rehashing the entire document thereby constraining recomputations to the to be erased/substituted parts.

Figure 4:
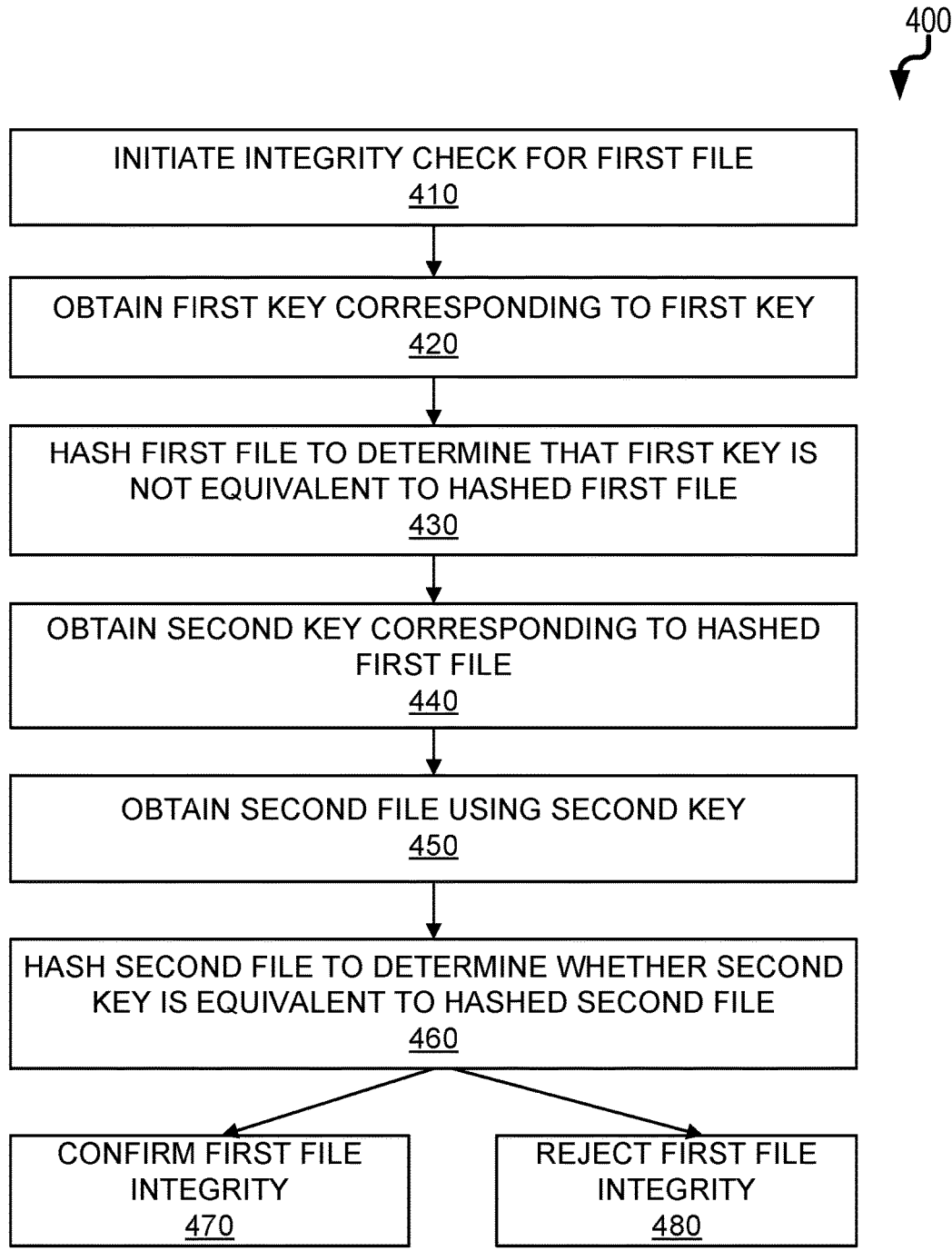
FIG. 4 is a third process flow diagram illustrating an integrity check of a document.

FIG. 4 is a process flow diagram 400 in which, at 410, an integrity check for a first file is initiated. Thereafter, at 420, a first key corresponding to the first file is obtained. The first file is then, at 430, hashed to determine that the first key is not equivalent to the hashed first file (if the hashed first file matches the first key then the integrity of the first file can be confirmed). Subsequently, at 440, a second key corresponding to the hashed first file is obtained so that, at 450, a second file can be obtained using the second key. The second file is later hashed, at 460, to determine whether the second key is equivalent to the hashed second file. The integrity of the first file can be confirmed, at 470, if the second key is equivalent to the hashed second file or the integrity of the first file can be rejected, at 480, if the second key is not equivalent to the hashed second file.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 5:
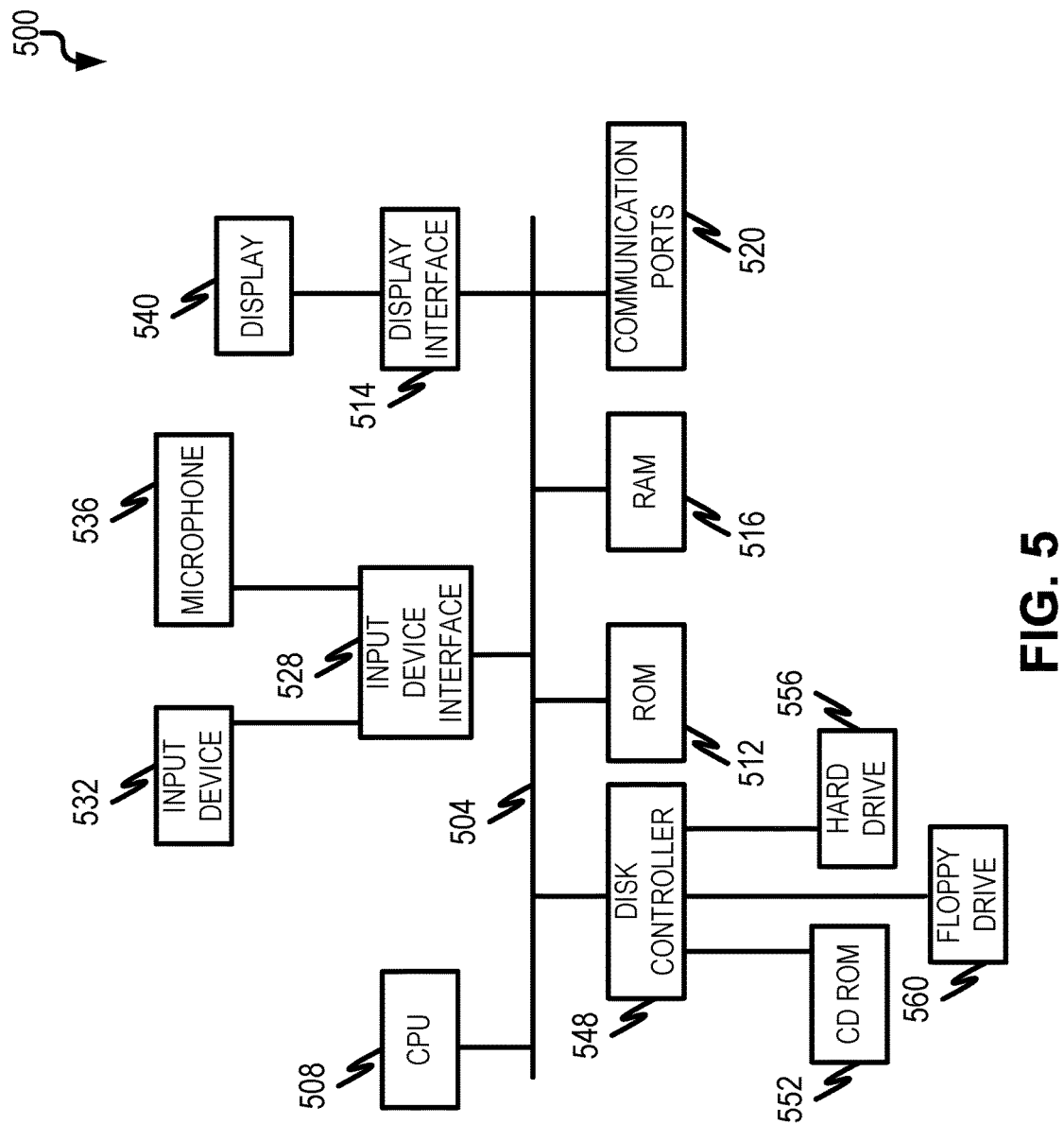
FIG. 5 is a logical diagram illustrating a computing device for implementing aspects of the subject matter described herein.

FIG. 5 is a diagram 500 illustrating a sample computing device architecture for implementing various aspects described herein. A bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface one or more optional disk drives to the system bus 504. These disk drives can be external or internal floppy disk drives such as 560, external or internal CD-ROM, CD-R, CD-RW or DVD, or solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the communication port 520 includes or otherwise comprises a network interface.

To provide for interaction with a user, the subject matter described herein can be implemented on a computing device having a display device 540 (e.g., a CRT (cathode ray tube) or LCD (liquid crystal display) monitor) for displaying information obtained from the bus 504 to the user and an input device 532 such as keyboard and/or a pointing device (e.g., a mouse or a trackball) and/or a touchscreen by which the user can provide input to the computer. Other kinds of input devices 532 can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. In the input device 532 and the microphone 536 can be coupled to and convey information via the bus 504 by way of an input device interface 528. Other computing devices, such as dedicated servers, can omit one or more of the display 540 and display interface 524, the input device 532, the microphone 536, and input device interface 528.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one more data processors forming part of at least one computing device, the method comprising:
   initiating, by at least one data processor, an integrity check for a first file;
   obtaining, by at least one data processor, a first key corresponding to the first file;
   hashing, by at least one data processor, the first file to determine that the first key is not equivalent to the hashed first file;
   obtaining, by at least one data processor and in response to the determination that the first key is not equivalent to the hashed first file, a second key corresponding to the hashed first file;
   obtaining, by at least one data processor, a second file using the second key;
   hashing, by at least one data processor, the second file to determine whether the second key is equivalent to the hashed second file;
   confirming, by at least one data processor, integrity of the first file if the second key is equivalent to the hashed second file or rejecting, by at least one data processor, integrity of the first file if the second key is not equivalent to the hashed second file; and
   determining, by at least one data processor, whether metadata associated with the second file comprises a reference to the first key, wherein the metadata indicates that at least a portion of the first file has been deleted;
   wherein integrity of the first file is confirmed if the metadata associated with the second file comprises a reference to the first key and integrity of the first file is rejected if the metadata associated with the second file does not comprise a reference to the first key.

2. The method of claim 1, wherein the first and second files are stored in a data storage system having an audit log in which all changes to the first and second files are logged.

3. The method of claim 2, wherein all accesses to the first and second files are logged in the audit log.

4. The method of claim 1, wherein at least one of the first file and the second file has a structure that can be represented as a hierarchy of nodes including a root node, wherein the hashing only hashes the root node of the corresponding first file or second file.

5. The method of claim 4, wherein the structure is a Merkle tree.

6. The method of claim 1, further comprising:
   alternatively hashing, by at least one data processor, the first file to determine that the first key is equivalent to the hashed first file.

7. A system comprising:
   at least one data processor; and
   memory storing instructions which, when executed by the at least one data processor, result in operations comprising:
   initiating an integrity check for a first file;
   obtaining a first key corresponding to the first file;
   hashing the first file to determine that the first key is not equivalent to the hashed first file;
   obtaining a second key corresponding to the hashed first file in response to the determination that the first key is not equivalent to the hashed first file;
   obtaining a second file using the second key;
   hashing the second file to determine whether the second key is equivalent to the hashed second file;
   confirming integrity of the first file if the second key is equivalent to the hashed second file or rejecting integrity of the first file if the second key is not equivalent to the hashed second file; and
   determining whether metadata associated with the second file comprises a reference to the first key, wherein the metadata indicates that at least a portion of the first file has been deleted;
   wherein integrity of the first file is confirmed if the metadata associated with the second file comprises a reference to the first key and integrity of the first file is rejected if the metadata associated with the second file does not comprise a reference to the first key.

8. The system of claim 7, wherein the first and second files are stored in a data storage system having an audit log in which all changes to the first and second files are logged.

9. The system of claim 8, wherein all accesses to the first and second files are logged in the audit log.

10. The system of claim 7, wherein at least one of the first file and the second file has a structure that can be represented as a hierarchy of nodes including a root node, wherein the hashing only hashes the root node of the corresponding first file or second file.

11. The system of claim 10, wherein the structure is a Merkle tree.

12. The system of claim 7, wherein the operations further comprise:
   alternatively hashing the first file to determine that the first key is equivalent to the hashed first file.

13. A non-transitory computer program product storing instructions which, when executed by at least one data processor forming part of at least one computing device, result in operations comprising:
   initiating an integrity check for a first file;
   obtaining a first key corresponding to the first file;
   hashing the first file to determine that the first key is not equivalent to the hashed first file;
   obtaining a second key corresponding to the hashed first file in response to the determination that the first key is not equivalent to the hashed first file;
   obtaining a second file using the second key;
   hashing the second file to determine whether the second key is equivalent to the hashed second file; and
   confirming integrity of the first file if the second key is equivalent to the hashed second file or rejecting integrity of the first file if the second key is not equivalent to the hashed second file by:
      determining whether metadata associated with the second file comprises a reference to the first key, wherein the metadata indicates that at least a portion of the first file has been deleted;
   wherein integrity of the first file is confirmed if the metadata associated with the second file comprises a reference to the first key and integrity of the first file is rejected if the metadata associated with the second file does not comprise a reference to the first key;
   wherein the metadata indicates why, when, and by whom that at least a portion of the first file has been deleted.

14. The computer program product of claim 13, wherein the first and second files are stored in a data storage system having an audit log in which all changes to the first and second files are logged, wherein all accesses to the first and second files are logged in the audit log.

15. The computer program product of claim 13, wherein at least one of the first file and the second file has a structure that can be represented as a hierarchy of nodes including a root node, wherein the hashing only hashes the root node of the corresponding first file or second file.

16. The method of claim 1, wherein the metadata comprises an original name for the first file, path or directory names for the first file, and filesystem permissions for the first file.

17. The system of claim 7, wherein the metadata comprises an original name for the first file, path or directory names for the first file, and filesystem permissions for the first file.

18. The computer program product of claim 13, wherein the structure is a Merkle tree.

19. The computer program product of claim 13, wherein the operations further comprise:
   alternatively hashing the first file to determine that the first key is equivalent to the hashed first file.

* * * * *